(12) United States Patent
She et al.

(10) Patent No.: US 12,025,824 B2
(45) Date of Patent: Jul. 2, 2024

(54) LIGHT GUIDE FILM, PRODUCTION METHOD THEREOF AND LIGHT GUIDE DEVICE

(71) Applicant: HANGZHOU XINENG NEW MATERIAL CO., LTD., Zhejiang (CN)

(72) Inventors: Xiaofeng She, Zhejiang (CN); Keqing Hu, Zhejiang (CN)

(73) Assignee: HANGZHOU XINENG NEW MATERIAL CO., LTD., Hangzhou (CN)

( * ) Notice: Subject to any disclaimer, the term of this patent is extended or adjusted under 35 U.S.C. 154(b) by 316 days.

(21) Appl. No.: 17/464,674

(22) Filed: Sep. 1, 2021

(65) Prior Publication Data

US 2021/0396925 A1    Dec. 23, 2021

Related U.S. Application Data

(63) Continuation of application No. PCT/CN2021/073199, filed on Jan. 22, 2021.

(30) Foreign Application Priority Data

Mar. 24, 2020    (CN) .......................... 202010213902.9

(51) Int. Cl.
F21V 8/00    (2006.01)

(52) U.S. Cl.
CPC .......... *G02B 6/0053* (2013.01); *G02B 6/0015* (2013.01); *G02B 6/0028* (2013.01); *G02B 6/0065* (2013.01)

(58) Field of Classification Search
None
See application file for complete search history.

(56) References Cited

U.S. PATENT DOCUMENTS

| 6,657,683 B2 * | 12/2003 | Richard | G02B 6/0053 349/63 |
| 7,537,369 B2 * | 5/2009 | Takata | G02B 6/0036 362/616 |

(Continued)

FOREIGN PATENT DOCUMENTS

| CN | 102354012 A | 2/2012 |
| CN | 102565923 A | 7/2012 |

(Continued)

OTHER PUBLICATIONS

European Search Report of counterpart European Patent Application No. 21759001.7 issued on Jan. 4, 2022.

(Continued)

*Primary Examiner* — Rhonda S Peace (57) ABSTRACT

The application relates to a light guide film, a production method thereof and a light guide device. An upper surface of the light guide film is a light exit surface and a lower surface is a light incident surface; the lower surface of the light guide film is smooth and is used for being connected with the substrate; a plurality of hollow ultrastructures are disposed in the light guide film, the hollow ultrastructure close to the lower surface of the light guide film is a conduction reflecting surface, and a gap between every two adjacent ultrastructures is a light exit gap.

7 Claims, 11 Drawing Sheets

(56) References Cited

U.S. PATENT DOCUMENTS

| | | | |
|---|---|---|---|
| 7,733,439 B2* | 6/2010 | Sampsell | G02B 6/0053 349/67 |
| 8,630,518 B2* | 1/2014 | Huang | G02B 6/0035 385/39 |
| 8,956,034 B1* | 2/2015 | Johnson | G02B 6/003 362/616 |
| 8,971,680 B2* | 3/2015 | Huang | G02B 6/0053 385/39 |
| 11,536,896 B2* | 12/2022 | Rinko | G02B 6/0038 |
| 2011/0244187 A1 | 10/2011 | Rinko | |
| 2011/0296726 A1* | 12/2011 | Rinko | G02B 6/10 156/219 |
| 2013/0314943 A1 | 11/2013 | Huang | |
| 2013/0315534 A1 | 11/2013 | Huang et al. | |
| 2021/0396925 A1* | 12/2021 | She | G02B 6/0015 |

FOREIGN PATENT DOCUMENTS

| | | | | |
|---|---|---|---|---|
| CN | 103105641 A | 5/2013 | | |
| CN | 106291799 A | 1/2017 | | |
| CN | 110737042 A | 1/2020 | | |
| CN | 111239887 A | 6/2020 | | |
| EP | 1988333 A1 | 11/2008 | | |
| JP | 2009512159 A | 3/2009 | | |
| WO | 2019087118 A1 | 5/2019 | | |
| WO | WO-2019087118 A1 * | 5/2019 | | G02B 6/0031 |
| WO | 2019182098 A1 | 9/2019 | | |
| WO | 2019224705 A1 | 11/2019 | | |

OTHER PUBLICATIONS

Official Communication of counterpart European patent application No. 21759001.7 issued on Dec. 22, 2022.

* cited by examiner

LIGHT GUIDE FILM, PRODUCTION METHOD THEREOF AND LIGHT GUIDE DEVICE

CROSS-REFERENCE TO RELATED APPLICATION

This application is a continuation of international application of PCT application No. PCT/CN2021/073199 filed on Jan. 22, 2021, which claims the priority benefit of China application No. 202010213902.9 filed on Mar. 24, 2020. The entirety of each of the above-mentioned patent applications is hereby incorporated by reference herein and made a part of this specification.

BACKGROUND

Technical Field

The application relates to the field of light guide materials, and more particularly, to a light guide film, a production method thereof and a light guide device.

Description of Related Art

A light guide structure is commonly found in a light guide plate, and the light guide plate is a high-tech product for converting a linear light source into a surface light source. Light guide spots are printed on the bottom surface of an optical-grade acrylic/PC plate by using an engraving printing technology. The light emitted from the light source is absorbed by the optical-grade acrylic plate and is continuously and totally reflected inside the plate, when the light irradiates each light guide spot, the reflected light can be diffused at various angles, and then emitted from the front surface of the light guide plate after breaking the reflection condition. The light guide plate can emit light uniformly through various light guide spots with different densities and sizes.

The light guide plate is high in manufacturing cost and precise in optical structure, and the whole light guide plate needs to be wasted once being damaged. Currently, the light guide plate is replaced by combining a light guide film with a transparent substrate, such as Chinese patent application with the publication number of CN102565923A, a composite light guide plate is disclosed, which has a transparent substrate and a transparent film, and a plurality of light guide spots are printed on the transparent film and attached to the back surface of the transparent substrate. The above solution is to print the light guide spots on the transparent film firstly, and then combine the transparent film printed with the light guide spots with the transparent substrate, to form the composite light guide plate. Since the light guide spots are printed on the transparent thin film, it is easier to implement than direct printing on the transparent substrate, which reduces manufacturing difficulty, and even if bad scrapping occurs, only the part of the transparent film needs to be scrapped while the part of the transparent substrate is intact, so that the cost can be reduced.

However, the above-mentioned solution has certain drawbacks, because the transparent film and the transparent substrate are separately arranged, the firmness of the bonding between the transparent film and the transparent substrate should be considered when the transparent film and the transparent substrate are bonded. The light guide points are arranged on the transparent film, when the surface with the light guide points on the transparent film is in contact with the transparent substrate, not the surface-to-surface bonding but the point-to-surface bonding is adopted between the two. Although there are a lot of light guide points, the transparent film and the transparent substrate are not made of the same material, and the point-to-surface bonding is easy to separate, which is not beneficial for long-term use.

SUMMARY

In view of the disadvantages present in the prior art, this application provides a light guide film, a production method thereof and a light guide device, which can improve the bonding area and intensity between the light guide film and the substrate, and better protect the ultrastructure without affecting the light guiding effect.

To this end, this application provides the following technical solutions: a light guide film is provided, an upper surface of the light guide film is a light exit surface and a lower surface is a light incident surface; the lower surface of the light guide film is smooth, and used for being connected with the substrate; a plurality of hollow ultrastructures are disposed in the light guide film, each hollow ultrastructure includes a conduction reflecting surface close to the lower surface of the light guide film, a top surface close to the upper surface of the light guide film, and a light exit reflecting surface connecting the conduction reflecting surface and the top surface, and a gap between every two adjacent ultrastructures is a light exit gap.

Compared with the prior art, the lower surface of the light guide film is smoothly arranged, so that when the lower surface of the light guide film is fixed with the substrate, the whole surface can be bonded, the contact area is maximized, the fixing effect can also be optimized, and the light guide film and the substrate are not easy to separate.

In the present application, a hollow ultrastructure is arranged inside the light guide film, so that light can be guided, light directly emitted to the hollow ultrastructure from the substrate can be totally reflected, light emitted to the light exit gap from the substrate can be finally emitted from the light exit surface, thereby achieving the light guide function. Furthermore, the ultrastructure of the light guide is arranged inside the light guide film, so that the ultrastructure for light guide is not easy to damage and has stronger stretch-resistant capability.

The hollow ultrastructure is sealed by the conduction reflecting surface, the top surface and the light exit reflecting surface, and the interior of the hollow ultrastructure is air, or other material having a large difference from the refractive index of the film material, and light emitted to the conduction reflecting surface may be totally reflected, and the optical path extends within the substrate. Light emitted to the light exit gap is emitted onto the light exit reflecting surface, and then reflected and emitted from the light exit surface. A plurality of hollow ultrastructures are arranged inside the light guide film to play a role of guiding light, and the included angle between the light reflecting surface and the light exit reflecting surface, and the size of the light exit gap are controlled, so as to control the light path, and light rays are gradually distributed on the light exit surface of the whole light guide film.

Preferably, the conduction reflecting surface is a flat surface or a curved surface; when the conduction reflecting surface is a curved surface, the included angle between a tangent plane at any point on the curved surface and the light incident surface is less than 10°.

By adopting the above technical solution, when the conduction reflecting surface is a flat surface, the conduction reflecting surface can be parallel to the light incident surface, and the reflection path of light is regular. When the conduction reflecting surface is a curved surface, the light path is irregular, and different light guiding effects and differentiated visual effects are generated.

Preferably, the light exit reflecting surface is an inclined surface or a curved surface; when the light exit reflecting surface is an inclined surface, the included angle between the light exit reflecting surface and the light incident surface is 45° to 85°; when the light exit reflecting surface is a curved surface, the included angle between a tangent plane at any point on the curved surface and the light incident surface is 45° to 85°.

By adopting the above technical solution, when light rays are irradiated on the inclined surface, the light rays are reflected and then irradiated on the light exit surface, and since the angles of the light irradiated on the inclined surface are different, the angles of the light irradiated on the light exit surface after being reflected are also different, and the intensity of the light emitted is different. If the light exit reflecting surface is arranged as a cambered surface, the angle of the cambered surface is arranged in advance, such that the light rays are vertically emitted to the light exit surface as much as possible, after the light lays are reflected by the cambered surface, so that light rays emitted from the light exit surfaces reaches the maximum light intensity, substantially remains uniform, and the light rays are emitted more uniformly.

Preferably, the distance between the bottom line of the conduction reflecting surface and the light incident surface is 0.001-1 mm, and the bottom lines of all the conduction reflecting surfaces are equidistant or non-equidistant from the light incident surface.

In the prior art, the ultrastructure is arranged on the surface of the light guide film, and light rays pass through the substrate and then are directly emitted to the ultrastructure, so that the light utilization efficiency is very high. However, in the present application, in order to achieve a better bonding effect between the light guide film and the substrate, the ultrastructure is arranged inside the light guide film, therefore, the ultrastructure and the substrate are spaced apart by a thin layer of light guide film, which has a certain influence on the light path, and light needs to pass through the thin layer of film before reaching the ultrastructure. Therefore, the thinner the thin layer of film, the smaller the effect of the thin film on light refraction, the smaller the change of the light path; generally, when the thickness of the thin film is less than 1$mm$, and the light path change is negligible.

Preferably, the light exit gap between every two adjacent ultrastructures are equidistant or non-equidistant.

The light exit gap between ultrastructures can be equidistant or non-equidistant, if equidistant, the light emission is relatively uniform; and if non-equidistant, the light guiding efficiency of each light exit gap can be changed, so that the light finally emitted from the light guide film is significantly changed, and the visual effect is better.

This application further provides a process for producing a light guide film, which includes the following steps of:
1) selecting raw materials, the raw materials of the light guide film are transparent high polymer materials;
2) selecting a mold conforming with the light guide film, the mold includes an upper die and a lower die;
3) injecting the raw materials into the upper die and the lower die respectively, removing or continuously drawing semi-finished products from the mold after the raw materials are semi-formed, and molding by bonding each other before being fully cured.

The polymer material can be selected from transparent thermosetting silica gel or thermoplastic silica gel, and an integrally formed light guide film, the process is simpler, and the hollow ultrastructure is arranged inside the light guide film, and is not easily damaged by itself and has a stronger stretch-resistant capability while guiding light.

Since the ultrastructure is disposed inside the light guide film, it is difficult to form at a time through a single mold. The mold is divided into two parts, and the light guide film is divided into two parts, which are respectively formed. Before the two materials are completely cured, the two materials are attached by utilizing the characteristics of the silica gel material, so that curing forming is realized.

Preferably, the upper die or the lower die is provided with a micro-structure matching with the ultrastructure.

The precision of the ultrastructure is too high. If the upper die and the lower die each has a part of the ultrastructure, the precise bonding cannot be ensured when the last two parts of the finished product are bonded, the ultrastructure is easily displaced, which affects the light guiding effect. Therefore, the micro-structure is individually disposed in the upper die or the lower die, so that one of the molded finished products has an ultrastructure and can be bonded to another finished product, thereby ensuring accuracy of the ultrastructure.

This application further provides a process for producing a light guide film, which includes the following steps of:
1) selecting raw materials, wherein the raw materials of the light guide film are transparent high polymer materials;
2) selecting a mold conforming with the light guide film, wherein the light guide film is formed by hollow extrusion molding, an extrusion mold includes a microstructure core mold, the raw materials are molded in the mold, and then stretched after leaving a die orifice, to obtain the light guide film with a hollow ultrastructure.

By adopting the above technical solution, the light guide film can be formed at a time through a single mold, the process is simpler, the molding effect is better, and the light guide film is not easily deformed.

This application further provides a process for producing a light guide film, which includes the following steps of:
1) selecting raw materials, wherein the raw materials of the light guide film are transparent high polymer materials;
2) selecting a mold conforming with the light guide film, wherein the light guide film is formed by hollow extrusion molding, opening dies to remove products and then mold core, to obtain the light guide film with a hollow ultrastructure.

By adopting the above technical solution, the light guide film can be formed at a time through a single mold, the process is simpler, the molding effect is better, and the light guide film is not easily deformed.

This application further provides a light guide device, which includes the light guide film described above, and further includes a transparent substrate, wherein a lower surface of the light guide film is fixed to the transparent substrate.

By adopting the above technical solution, since the lower surface of the light guide film is a smoothly transitioned flat surface, so that when the light guide film is fixed to the substrate, the whole surface can be attached, the contact area reaches the maximum, the fixing effect can be optimized, and the light guide film and the substrate are not easy to separate.

Preferably, a protective layer is arranged on the upper surface of the light guide film.

By adopting the above technical solution, the light guide film is made of a soft material and is easily stained with dirt such as dust, the light emitting effect can be improved by additionally arranging the protective layer, and cleaning is also convenient. The protection layer is preferably made of PET, and the PET is good in light transmittance, good in bonding effect with a silica gel light guide film, stable in physical performance and not prone to abrasion and deformation.

In summary, the present application has the following beneficial effects: the lower surface of the light guide film is smoothly arranged, so that when the lower surface of the light guide film is fixed with the substrate, the whole surface can be bonded, the contact area is maximized, the fixing effect can also be optimized, and the light guide film and the substrate are not easy to separate. Meanwhile, the ultrastructure is arranged inside the light guide film, so that light can be guided, the ultrastructure is not easy to damage and has stronger stretch-resistant capability.

DESCRIPTION OF THE EMBODIMENTS

Hereinafter, the present application is further illustrated in detail in combination with the accompanying drawings.

Embodiment 1

Figure 1:
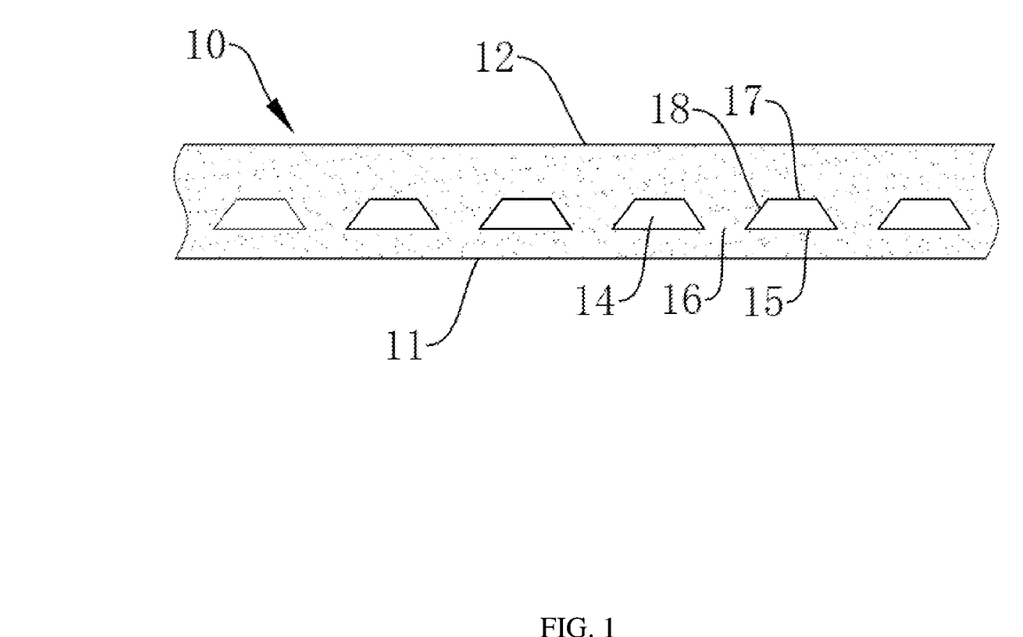
FIG. 1 is a structural schematic diagram of a light guide film in Embodiment 1.

Referring to FIG. 1, a light guide film 10 is provided, an upper surface of the light guide film 10 is a light exit surface 12, and a lower surface of the light guide film 10 is a light incident surface 11. The lower surface of the light guide film 10 is smooth and is used for being fixedly connected with the substrate 3 (see FIG. 2). A plurality of hollow ultrastructures 14 are disposed in the light guide film 10, and a side of the hollow ultrastructures 14 close to the lower surface of the light guide film 10 is a conduction reflecting surface 15, and a gap between every two adjacent ultrastructures 14 is a light exit gap 16.

Figure 2:
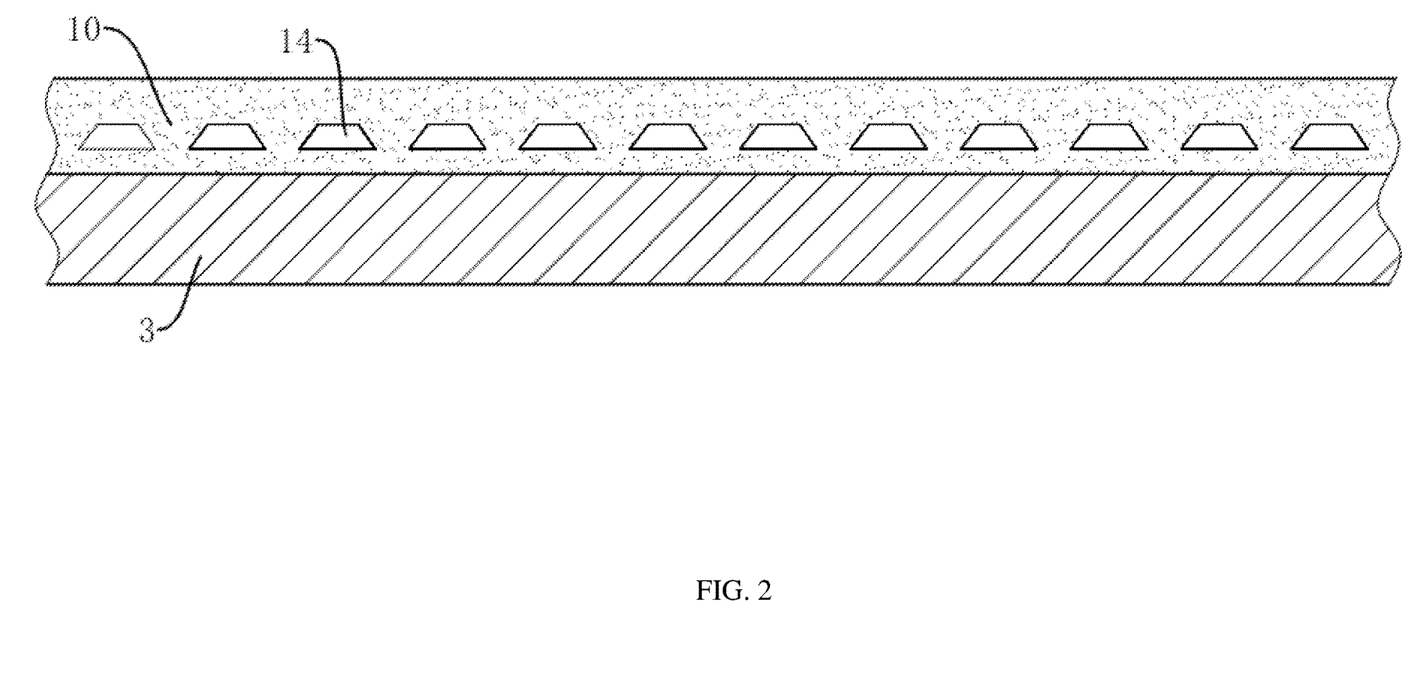
FIG. 2 is a structural schematic diagram illustrating a light guide film and a substrate are fixed in Embodiment 1.

In this embodiment, the lower surface of the light guide film 10 is arranged to be smooth, so that when the light guide film 10 is fixed to the substrate 3, the whole surface can be attached, the contact area reaches the maximum, the fixing effect can be optimized, and the light guide film 10 and the substrate 3 are not easy to separate.

In this embodiment, the hollow ultrastructure 14 includes a conduction reflecting surface 15 close to the lower surface of the light guide film 10, a top surface 17 close to the upper surface of the light guide film 10, and a light exit reflecting surface 18 connecting the conduction reflecting surface 15 and the top surface 17.

The hollow ultrastructure 14 is disposed inside the light guide film 10, so that light can be guided, light directly emitted from the substrate 3 to the hollow ultrastructure 14 can be totally reflected, light emitted from the substrate 3 to the light exit gap 16 can be finally emitted from the light exit surface 12, thereby achieving the light guide function. Furthermore, the light guide ultrastructure is disposed inside the light guide film 10, so that the light guide film 10 is not easy to damage and stronger in stretch-resistant capability. The hollow ultrastructure 14 is sealed by the conduction reflecting surface 15, the top surface 17 and the light exit reflecting surface 18, and the interior of the hollow ultrastructure 14 is air, or other material having a large difference from the refractive index of the film material, and light emitted to the conduction reflecting surface 15 may be totally reflected, and the optical path extends within the substrate 3. Light emitted to the light exit gap 16 is emitted onto the light exit reflecting surface 18, and then reflected and emitted from the light exit surface 12. A plurality of hollow ultrastructures 14 are arranged inside the light guide film 10 to play a role of guiding light, and the included angle between the light reflecting surface 15 and the light exit reflecting surface 18, and the size of the light exit gap 16 are controlled, so as to control the light path, and light rays are gradually distributed on the light exit surface 12 of the whole light guide film 10.

Figure 3:
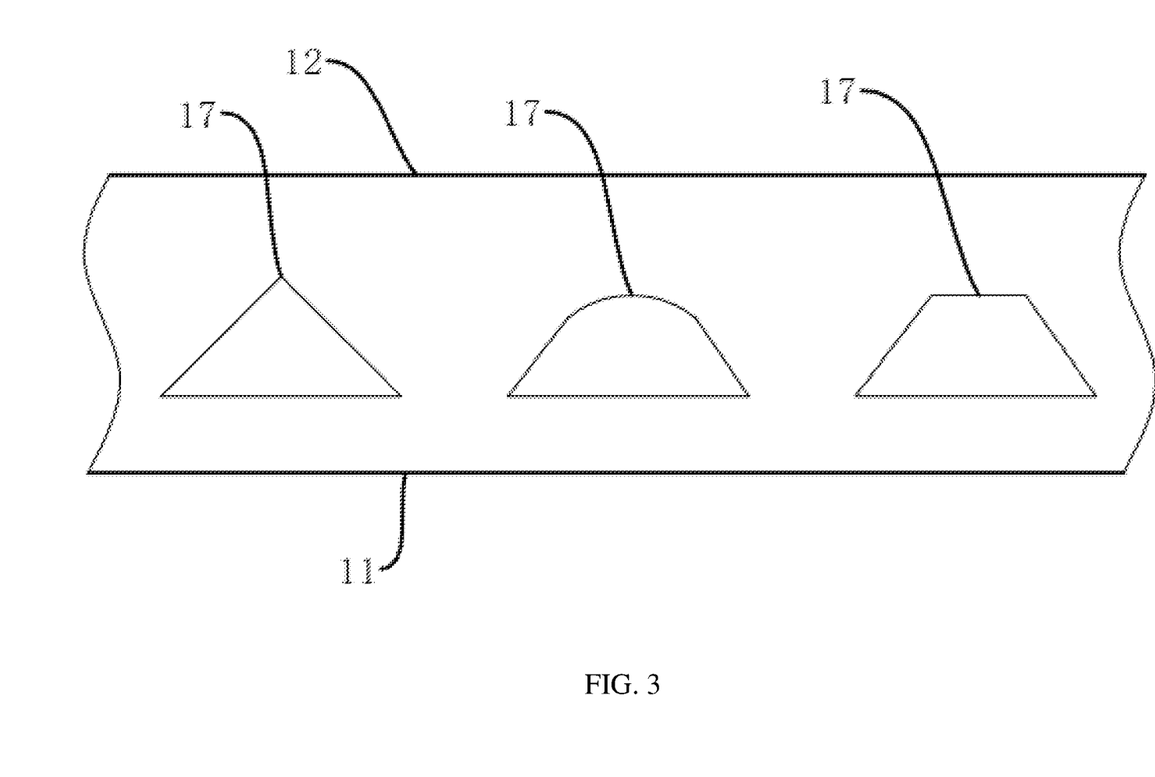
FIG. 3 is a structural schematic diagram illustrating various shapes of a top surface in Embodiment 1.

In this embodiment, since the top surface 17 has no light guiding effect, the top surface 17 can be designed in any shape, such as a flat surface, a cambered surface, a dot, or the like, as shown in FIG. 3.

Figure 4:
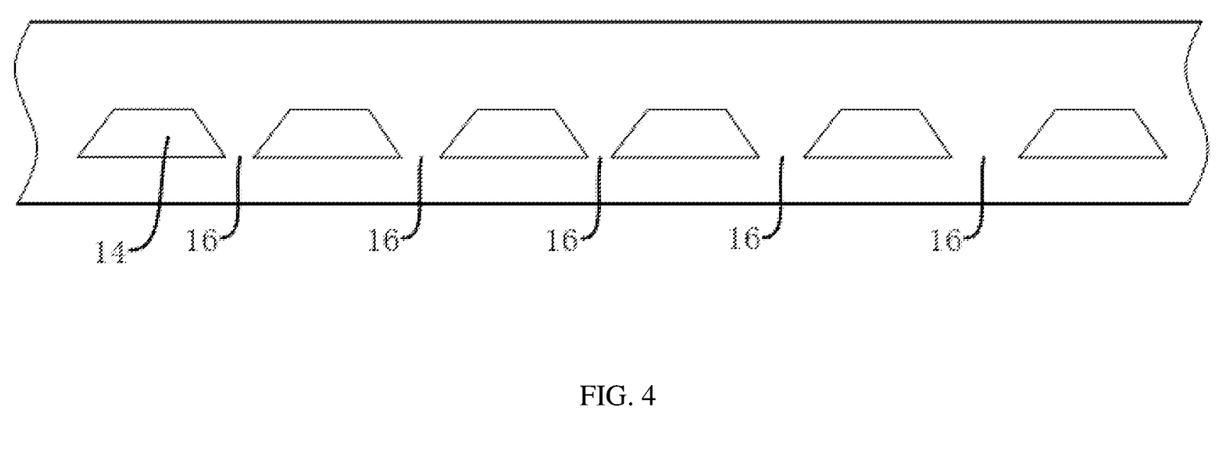
FIG. 4 is a schematic diagram illustrating non-equidistant light exit gaps in Embodiment 1.

In this embodiment, the light exit gaps 16 between the ultrastructures 14 may be equidistant or non-equidistant, as shown in FIG. 4.

Figure 6:
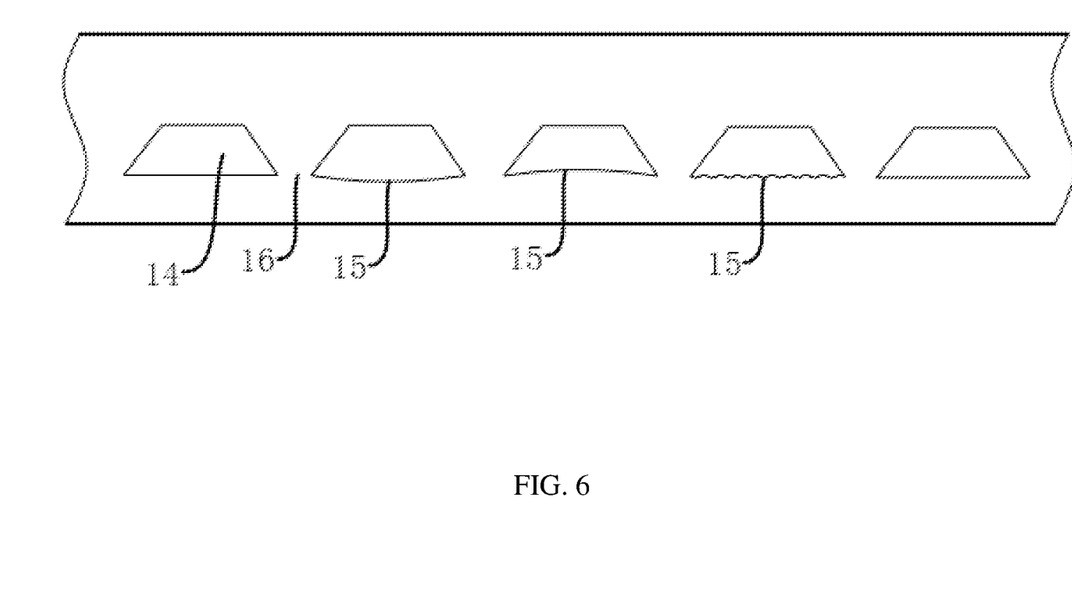
FIG. 6 is a schematic diagram illustrating the conduction reflecting surface is a curved surface in Embodiment 1.

As shown in FIG. 6, the conduction reflecting surface 15 may be a flat surface, or a curved surface, and an included angle between a tangent plane at any point on the curved surface and the light incident surface is less than 10°. The light distribution can be achieved according to different designs, so that there is a sense of hierarchy when light is emitted.

Figure 7:
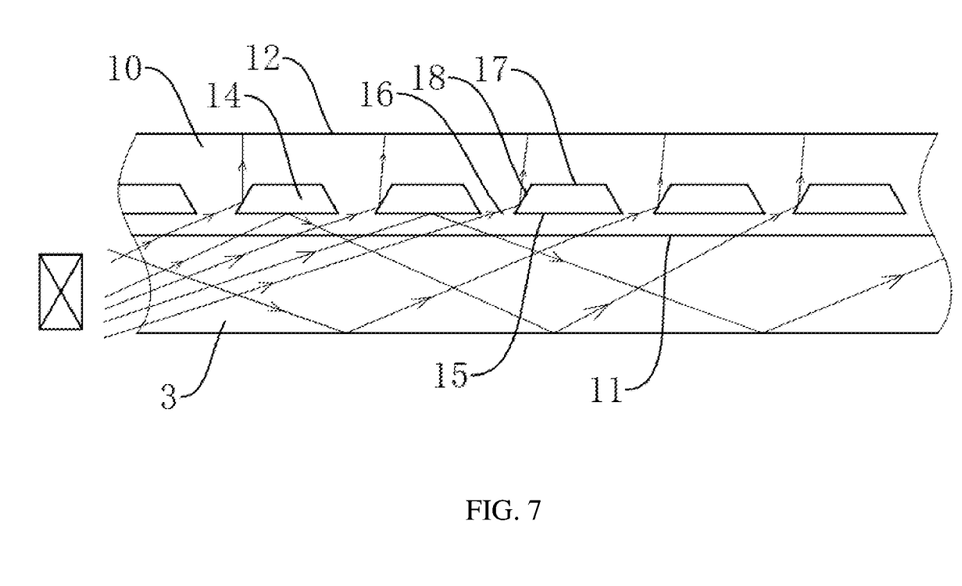
FIG. 7 is an optical path diagram in Embodiment 1.

As shown in FIG. 7, light is incident into the substrate 3 from the side surface of the substrate 3, and there are three cases of light path.

The first one is that the light rays are emitted to the junction between the substrate 3 and the light guide film 10, refracted into the light guide film 10, and then emitted to the light exit gap 16 between light guide structures in the light guide film 10, and the light continues to pass through the light exit gap 16 and is emitted to the light exit reflecting surface 18. Since the other side of the light exit reflecting surface 18 is a hollow ultrastructure 14, the refractive index of the air is low, the light rays are totally reflected on the light exit reflecting surface 18 and are emitted from the light exit surface 12.

The second one is that the light rays are emitted to the junction between the substrate 3 and the light guide film 10, refracted into the light guide film 10, and then emitted to the lower surface of the hollow ultrastructure 14 in the light guide film 10, that is, the conduction reflecting surface 15. Since the other side of the conduction reflecting surface 15 is a hollow ultrastructure 14, the refractive index of the air is low, the light rays are totally reflected on the conduction reflecting surface 15 and are emitted back to the substrate 3. The light rays continue to be totally reflected on one side of the substrate 3 away from the light guide film 10, and are emitted to the light guide film 10 again. If the light rays are emitted to the conduction reflecting surface 15 of the hollow ultrastructure 14 after passing through the light guide film 10, the light rays continue to be totally reflected repeatedly; if the light rays are emitted to the light exit gap 16 between the light guide structures after passing through the light guide film 10, the light rays are emitted from the light exit surface 12, as with the first case described above.

The third one is that the light rays are emitted to the one side of the substrate 3 away from the light guide film 10, and then are emitted to the light guide film 10 after being totally reflected, if the light rays are emitted to the light exit gap 16 between the light guide structures after passing through the light guide film 10, then the light rays are as with the first case described above; if the light rays are emitted to the conduction reflecting surface 15 of the hollow ultrastructure 14 after passing through the light guide film 10, then the light rays are as with the second case described above.

In this embodiment, the distance between the conduction reflecting surface 15 and the light incident surface 11 is 0.001-1 mm.

In the prior art, the ultrastructure 14 is arranged on the surface of the light guide film 10, and light rays pass through the substrate 3 and then are directly emitted to the ultrastructure 14, so that the light utilization efficiency is very high. However, in the present application, in order to achieve a better bonding effect between the light guide film 10 and the substrate 3, the ultrastructure 14 is arranged inside the light guide film 10, therefore, the ultrastructure 14 and the substrate 3 are spaced apart by a thin layer of light guide film 10, which has a certain influence on the light path, and light needs to pass through the thin layer of film before reaching the ultrastructure 14. Therefore, the thinner the thin layer of film, the smaller the effect of the thin film on light refraction, the smaller the change of the light path; generally, when the thickness of the thin film is less than 1*mm*, and the light path change is negligible.

In this embodiment, the distance between the conduction reflecting surface 15 and the light incident surface 11 is 0.001-1 mm, preferably 0.6 mm. The distance has certain influence on the light path, and after the light passes through the substrate 3, the light needs to be emitted to the conduction reflecting surface 15 or the light exit gap 16 only after passing through the small distance. Therefore, the shorter the distance, the smaller the effect of the thin film on light refraction, the smaller the change of the light path; when the thickness of the thin film is less than 1*mm*, and the light path change is negligible.

Figure 5:
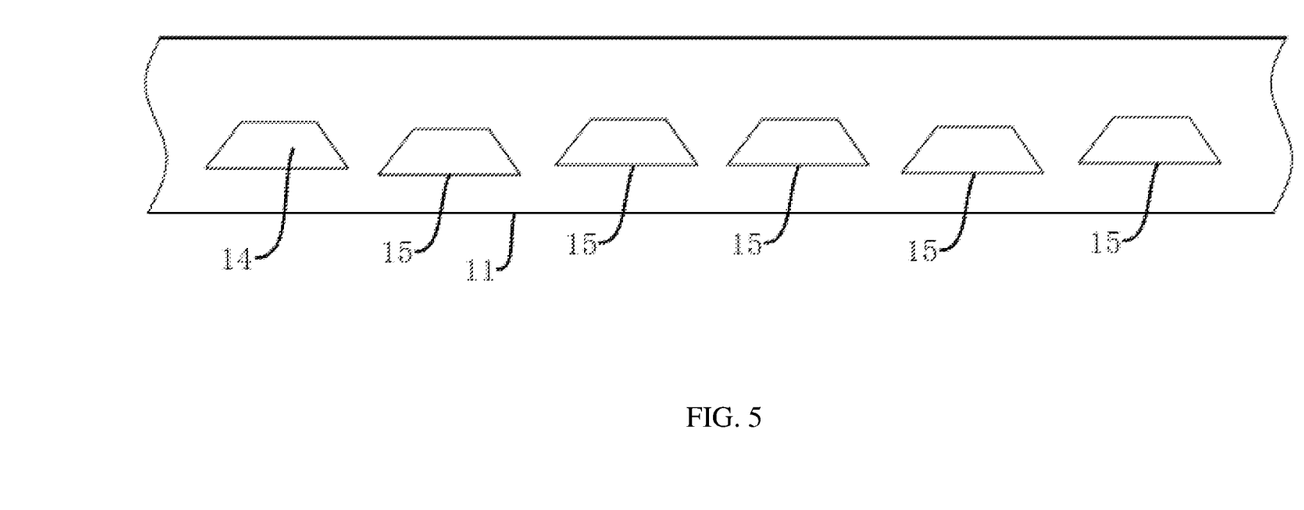
FIG. 5 is a schematic diagram illustrating a non-uniform distance between the conduction reflecting surface and the light incident surface of each ultrastructure in Embodiment 1.

The height of the conduction reflecting surface 15 to the light incident surface 11 of each ultrastructure 14 may be uniform or non-uniform, if uniform, the light emission is relatively uniform; and if non-uniform, as shown in FIG. 5, different light guiding effects and differentiated visual effects are generated.

In this embodiment, as shown in FIG. 6, the conduction reflecting surface 15 may be a flat surface or a curved surface. When the conduction reflecting surface 15 is a flat surface, the conduction reflecting surface 15 can be parallel to the light incident surface, and the reflection path of light is regular. When the conduction reflecting surface 15 is a curved surface, the included angle between a tangent plane at any point on the curved surface and the light incident surface is less than 10°, the light path is irregular, the light distribution can be achieved according to different designs, and different light guiding effects and differentiated visual effects are generated.

Embodiment 2

This embodiment differs from Embodiment 1 in that, in this embodiment, the light exit reflecting surface 18 is a cambered surface.

Figure 8:
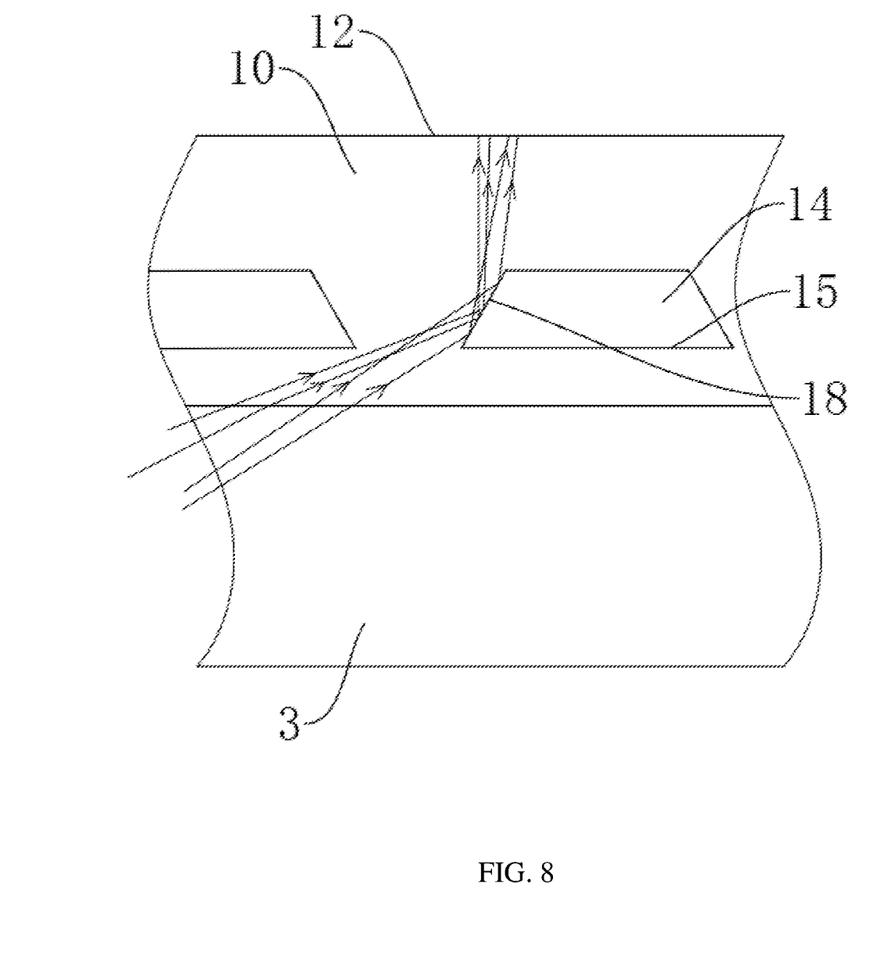
FIG. 8 is a schematic diagram illustrating light rays are reflected on a light exit reflecting surface in Embodiment 1.

Referring to FIG. 8, it is shown a light emitting path when the light exit reflecting surface 18 is an inclined surface in Embodiment 1. When light rays are irradiated on the inclined surface, the light rays are reflected and then irradiated on the light exit surface 12, and since the angles of the light irradiated on the inclined surface are different, the angles of the light irradiated on the light exit surface 12 after being reflected are also different, and the intensity of the light emitted is different.

Figure 9:
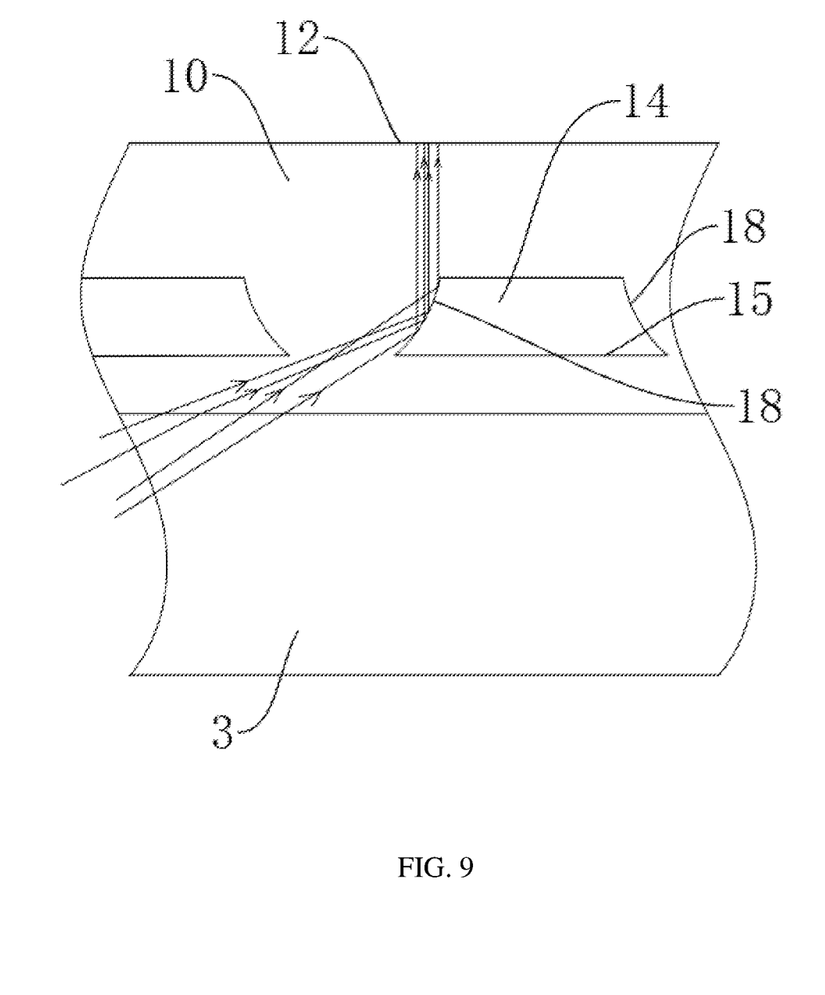
FIG. 9 is a schematic diagram illustrating light rays are reflected on a light exit reflecting surface in Embodiment 2.

In this embodiment, as shown in FIG. 9, the light exit reflecting surface 18 is arranged as a cambered surface. When the light exit reflecting surface is a curved surface, the included angle between a tangent plane at any point on the curved surface and the light incident surface is 45° to 85°. The angle of the cambered surface is designed such that the light rays are vertically emitted to the light exit surface 12 as much as possible, after the light lays are reflected by the cambered surface, so that light rays emitted from the light exit surfaces 12 reaches the maximum light intensity, substantially remains uniform, and the light rays are emitted more uniformly.

In this embodiment, the height of the light exit reflecting surface 18 is 0.5-3 times of the light exit gap 16, so that the number of the light exit gaps 16 that light passes through can be controlled, thus the light reflected out of the light guide film from the light exit reflecting surface 18 can be controlled, and the light emitting efficiency of the light guide film can be controlled.

Embodiment 3

This embodiment provides a production process of a hollow ultrastructure light guide film, which is used for producing the light guide film of Embodiment 1, and the production process includes the following steps of:

1) selecting raw materials, in which the raw materials of the light guide film are optical quality transparent silica gel;

2) selecting a mold (with an ultrastructure core mold) conforming with the light guide film;

3) injecting silica gel raw materials into the mold, and molding same by a silica gel molding process.

An integrally formed light guide film, the process is simpler, and the hollow ultrastructure is arranged inside the light guide film, and is not easily damaged by itself and has a stronger stretch-resistant capability while guiding light.

Embodiment 4

This embodiment differs from Embodiment 3 in that, the light guide film is formed by hollow extrusion molding.

The mold includes a micro-structure core mold, the raw materials are molded in the mold, and then stretched after leaving a die orifice, to obtain the light guide film with a hollow ultrastructure. The light guide film can be formed at a time through a single mold, the process is simpler, the molding effect is better, and the light guide film is not easily deformed.

Embodiment 5

Figure 10:
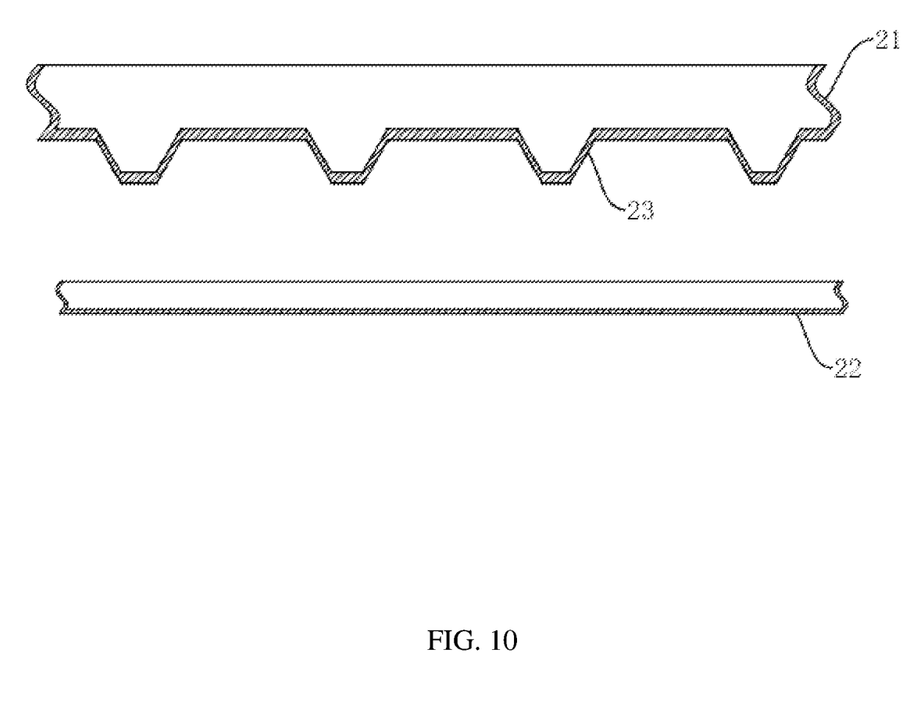
FIG. 10 is a structural schematic diagram of an upper die and a lower die in Embodiment 5

As shown in FIG. 10, this embodiment differs from Embodiment 1 in that, in this embodiment, the mold includes an upper die 21 and a lower die 22, and after the raw materials are respectively injected into the upper die 21 and the lower die 22, the semi-finished raw materials are removed from the mold after the raw materials are semi-formed, and the semi-finished raw materials are bonded to each other before being fully cured.

Since the ultrastructure is disposed inside the light guide film, it is difficult to form at a time through a single mold. The mold is divided into two parts, and the light guide film is divided into two parts, which are respectively formed. Before the two materials are completely cured, the two materials are attached by utilizing the characteristics of the silica gel material, so that curing forming is realized.

In this embodiment, the upper die 21 or the lower die 22 is provided with a micro-structure 23 matching with the ultrastructure.

The precision of the ultrastructure is too high. If the upper die 21 and the lower die 22 each has a part of the ultrastructure, the precise bonding cannot be ensured when the last two parts of the finished product are bonded, the ultrastructure is easily displaced, which affects the light guiding effect. Therefore, the micro-structure 23 is individually disposed in the upper die 21 or the lower die 22, so that one of the molded finished products has an ultrastructure and can be bonded to another finished product, thereby ensuring accuracy of the ultrastructure. In this embodiment, the micro-structure 23 is provided in the upper die 21.

Embodiment 6

Figure 11:
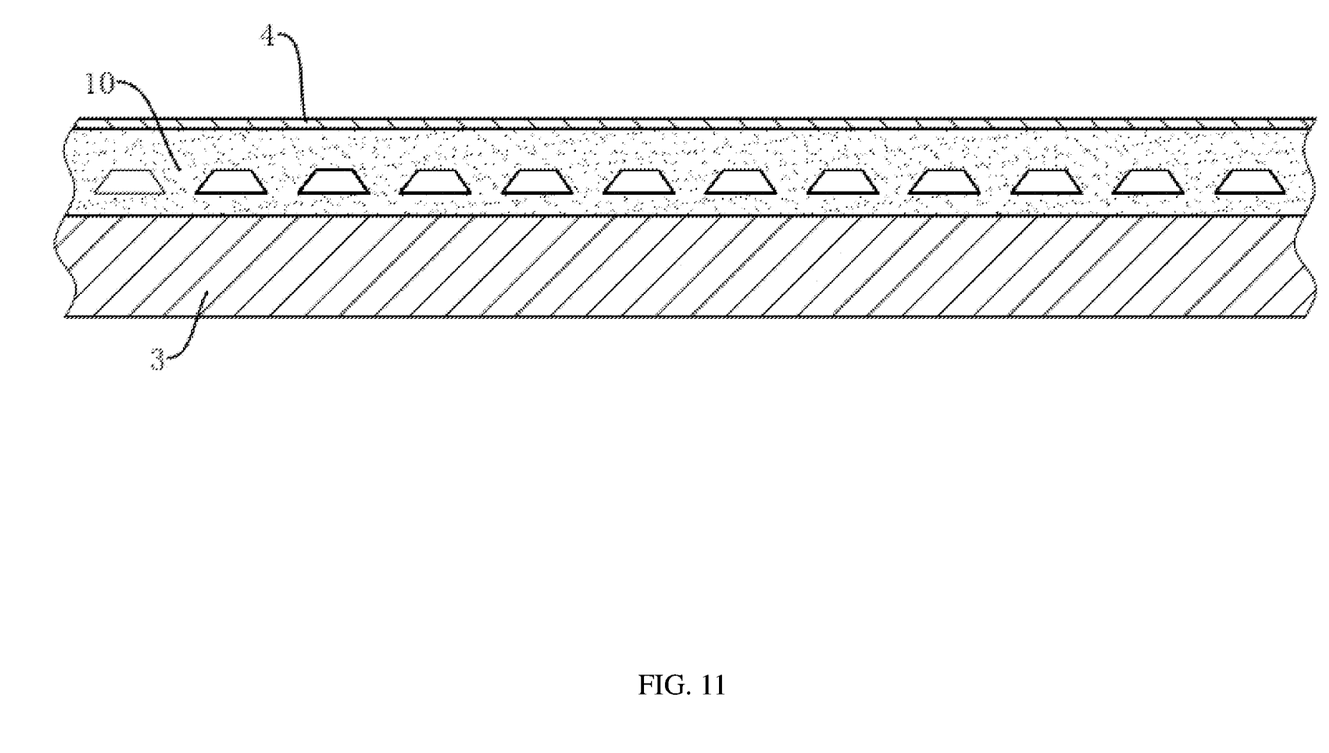
FIG. 11 is a structural schematic diagram in Embodiment 6.

As shown in FIG. 11, this embodiment discloses a light guide structure, which adopts the light guide film 10 of Embodiment 1, and further includes a transparent substrate 3 and a protective layer 4. The lower surface of the light guide film 10 is fixed with the transparent substrate 3, and a protective layer 4 is arranged on the upper surface of the light guide film 10.

The light guide film 10 is made of a soft material and is easily stained with dirt such as dust, the light emitting effect can be improved by additionally arranging the protective layer 4, and cleaning is also convenient. The protection layer 4 is preferably made of PET, and the PET is good in light transmittance, good in bonding effect with a silica gel light guide film, stable in physical performance and not prone to abrasion and deformation.

In addition, during processing, the protective layer 4 can be firstly attached to the light guide film 10, so that the hardness and strength of the light guide film can be increased. Then, the light guide film 10 is attached to the substrate 3, so that the light guide film 10 is not easily deformed when bonding.

These embodiments are merely explanatory and are not restrictive of the application. After reading this specification, those skilled in the art can make various modifications to the embodiments as needed without creative work, which falls within the protection scope defined by the appended patent claims.

What is claimed is:

1. A light guide film, wherein an upper surface of the light guide film is a light exit surface and a lower surface is a light incident surface; the lower surface of the light guide film is smooth and used for being connected with a substrate; a plurality of hollow ultrastructures are disposed in the light guide film, each hollow ultrastructure comprises a conduction reflecting surface close to the lower surface of the light guide film, a top surface close to the upper surface of the light guide film, and a light exit reflecting surface connected with the conduction reflecting surface and the top surface, and a gap between every two adjacent ultrastructures is a light exit gap, wherein the distance between the bottom line of the conduction reflecting surface and the light incident surface is 0.001-1 mm, and the bottom lines of all the conduction reflecting surfaces are equidistant or non-equidistant from the light incident surface, wherein the conduction reflecting surface is a curved surface, and an included angle between a tangent plane at any point on the curved surface and the light incident surface is less than 10°, wherein the light exit gap between every two adjacent ultrastructures are non-equidistant, and a height of the light exit reflecting surface is 0.5-3 times of the light exit gap.

2. The light guide film according to claim 1, wherein the light exit reflecting surface is an inclined surface or a curved surface; when the light exit reflecting surface is an inclined surface, the included angle between the light exit reflecting surface and the light incident surface is 45° to 85°; and when the light exit reflecting surface is a curved surface, the included angle between a tangent plane at any point on the curved surface and the light incident surface is 45° to 85°.

3. A process for producing a light guide film according to claim 1, comprising the following steps of:
1) selecting raw materials, wherein the raw materials of the light guide film are transparent high polymer materials;
2) selecting a mold conforming with the light guide film, wherein the mold comprises an upper die and a lower die; and
3) injecting the raw materials into the upper die and the lower die respectively, removing or continuously drawing semi-finished products from the mold after the raw materials are semi-formed, and molding by bonding each other before being fully cured.

4. The process for producing a light guide film according to claim 3, wherein the upper die or the lower die is provided with a micro-structure matching with the ultrastructure.

5. The process for producing a light guide film according to claim 1, comprising the following steps of:
1) selecting raw materials, wherein the raw materials of the light guide film are transparent high polymer materials;
2) selecting a mold conforming with the light guide film, wherein the light guide film is formed by hollow extrusion molding, an extrusion mold comprises a micro-structure core mold, the raw materials are molded in the mold, and then stretched after leaving a die orifice, to obtain the light guide film with a hollow ultrastructure.

6. The process for producing a light guide film according to claim 1, comprising the following steps of:
   1) selecting raw materials, wherein the raw materials of the light guide film are transparent high polymer materials; and
   2) selecting a mold conforming with the light guide film, wherein the light guide film is formed by hollow extrusion molding, opening dies to remove products and then mold core, to obtain the light guide film with a hollow ultrastructure.

7. A light guide device, comprising the light guide film according to claim 1, and further comprising a transparent substrate, wherein a lower surface of the light guide film is fixed to the transparent substrate.

* * * * *